United States Patent [19]

Swanberg

[11] Patent Number: 4,803,425

[45] Date of Patent: Feb. 7, 1989

[54] MULTI-PHASE PRINTED CIRCUIT BOARD TACHOMETER

[75] Inventor: Melvin E. Swanberg, Claremont, Calif.

[73] Assignee: Xerox Corporation, Stamford, Conn.

[21] Appl. No.: 104,726

[22] Filed: Oct. 5, 1987

[51] Int. Cl.[4] .......................... G01P 3/48; G01P 3/487
[52] U.S. Cl. .................................... 324/173; 336/200; 324/174
[58] Field of Search ............... 324/207, 173, 174, 208; 336/200, 220, 232; 310/168; 361/236, 240

[56] References Cited

U.S. PATENT DOCUMENTS

| | | | |
|---|---|---|---|
| 2,915,721 | 12/1959 | Farrand et al. | 336/200 |
| 3,765,082 | 10/1973 | Zyetz | 336/200 |
| 4,488,076 | 12/1984 | Macleod. | |
| 4,494,100 | 1/1985 | Stengel et al. | 336/200 |
| 4,551,676 | 11/1985 | Amemiya et al. | 324/174 |
| 4,697,144 | 9/1987 | Howbrook | 324/207 |

Primary Examiner—Reinhard J. Eisenzopf
Assistant Examiner—Maura K. Regan

[57] ABSTRACT

This invention relates to a multi-phase printed circuit board (PCB) tachometer for accurate measurement of the rotational speed and direction of an electric motor. The multi-phase output not only provides rotation velocity in the form of the conventional a-c output signal, but also provides rotation direction information, in addition to providing a higher rotational resolution than conventional PCB tachometers. According to a first embodiment of the present invention, a multi "winding", multi-phase PCB tachometer that uses a single multi-pole magnet is constructed by using double sided boards with plated through holes. In a second embodiment, a multi-phase tachometer configuration is disclosed in which the number of radial printed circuit traces and the number of pole magnets are not equal, whereby the individual voltages generated across each radial segment will not be in phase, and thus can provide rotational direction information as well as velocity information.

1 Claim, 4 Drawing Sheets

MULTI-PHASE PRINTED CIRCUIT BOARD TACHOMETER

This invention relates to a multi-phase printed circuit board (PCB) tachometer for accurate measurement of the rotational speed and direction of an electric motor. The multi-phase output not only provides rotation velocity in the form of the conventional a-c output signal, but also provides rotation direction information, in addition to providing a higher rotational resolution than conventional PCB tachometers.

BACKGROUND OF THE INVENTION

In situations where the speed of a motor must be continually monitored, the prior art has provided for many forms of speed measurement, and also for the direction of rotation of the motor shaft. Optical methods have been demonstrated as well as magnetic devices. One such teaching of magnetically sensed rotational velocity of a motor can be found in U.S. Pat. No. 4,488,076, to Donald J. Macleod, which issued on Dec. 11, 1984. This patent discloses the use of a commutator magnet portion which rotates with the shaft of the motor. The stator portion includes conducting traces which are situated such that the rotation of the commutating magnet past the traces on the circuit board induces a current in the traces. However, this patent does not teach the accuracy of a multi-phase tachometer or the use thereof for accurate rotational speed determination and the direction of rotation.

According to a first embodiment of the present invention, a multi "winding", multi-phase PCB tachometer that uses a single multi-pole magnet is constructed by using double sided boards with plated through holes. The radial elements of two or more "windings" can be interlaced with equal spacing, then the ends of the respective elements linked together with PCB trace crossover being accomplished on the back side of the PCB. That is, the radial arms of the traces would all be on one side of the PCB. The outer edges or circumferential elements thereof would be formed as traces on the other side of the board and connected by the many plated through holes 48. In a second embodiment, a multi-phase tachometer configuration is disclosed in which the number of radial printed circuit traces and the number of pole magnets are not equal, whereby the individual voltages generated across each radial segment will not be in phase, and thus can provide rotational direction information as well as velocity information. Increased resolution is also provided. The printed circuit traces are closed loop, rather than open circuited, and provide for accurate speed and direction information.

DESCRIPTION OF THE DRAWINGS

For a more complete understanding of the invention, reference may be had to the following detailed description of the invention in conjunction with the drawings wherein:

FIG. 1A is a schematic diagram of a typical printed circuit board tachometer winding, while

DETAILED DESCRIPTION OF THE INVENTION

Figure 1A:
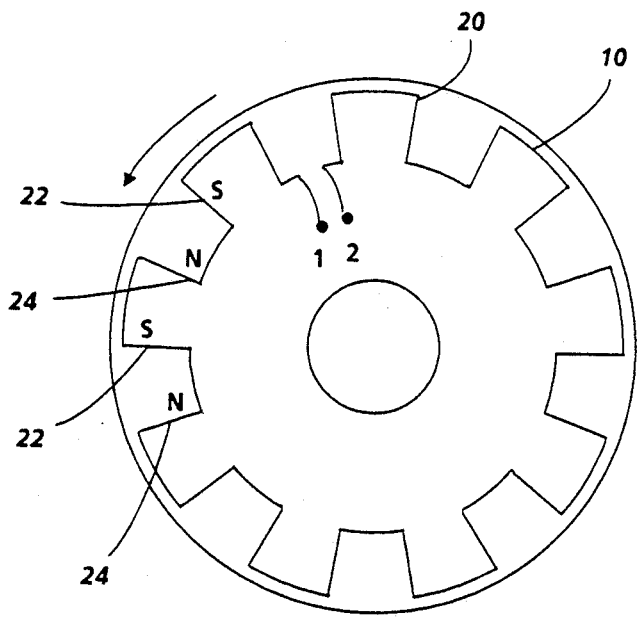
Figure 1B:
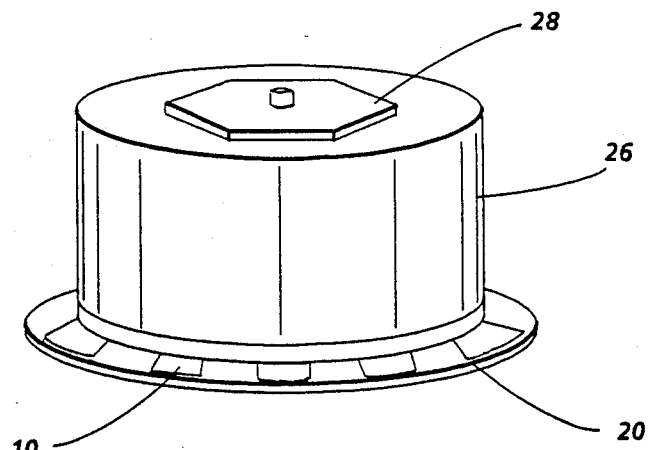
FIG. 1B shows the wiring trace of FIG. 1A beneath a motor section.

Printed circuit board traces are commonly used as coils in conjunction with multi-pole magnets to perform the function of a tachometer. For example, FIGS. 1A and 1B show schematically the use of such a printed circuit trace in a Toshiba Company motor 26 which is generally utilized to drive a multi-faceted rotating polygon 28 in a laser scanning system. FIG. 1A shows tachometer winding trace 10 which has been formed on substrate 20 in any of the known prior art techniques for manufacturing printed circuit boards. This particular motor under discussion has an 18 pole magnet mounted on the lower rim of motor 26. If the motor rotates while the printed circuit board (PCB) 20 remains stationary, there will be relative motion between the rotating magnets and the tachometer winding traces 10. In FIG. 1A has been shown only a few north and south pole configurations adjacent radial traces 22 and 24. If the magnets are rotating counterclockwise as shown by the arrow in the figure, the north (N) and south (S) poles of the rotating magnets at one point in time will be as shown in FIG. 1A. As the north poles cross radial traces 24 it will cause a voltage to be generated in one direction in those traces. At the same time, the south poles cross radial traces 22 and generate a voltage in the opposite direction. But since the radial traces themselves point in opposite directions, there will be an alternating current voltage generated in the winding trace 10 which can be detected and passed on to other circuitry via terminals 1 and 2 on the printed circuit board in FIG. 1A. The output a-c voltage will generally remain the same but the frequency of the output signal is directly proportional to the velocity of the rotating magnets. A phase-locked loop, in a prior art manner, can be used to control the speed of the motor in response to the a-c voltage signal generated.

Figure 2:
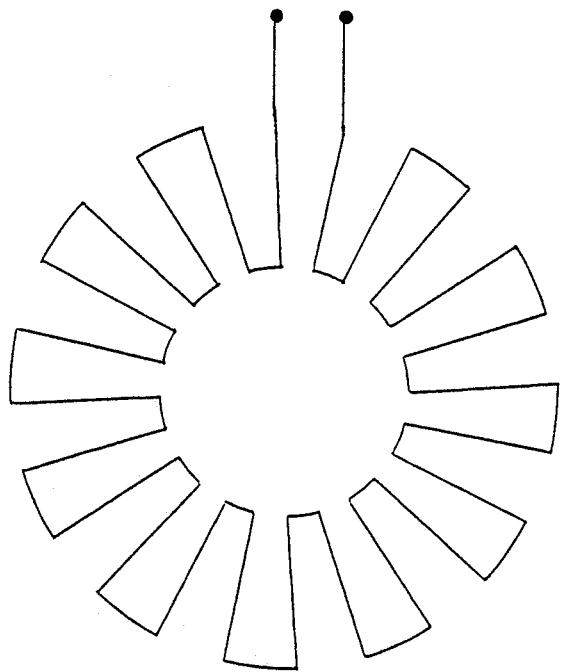
FIG. 2 is a printed circuit board tachometer trace with the external leads outside the circumference of the remainder of the trace.
Figure 3A:
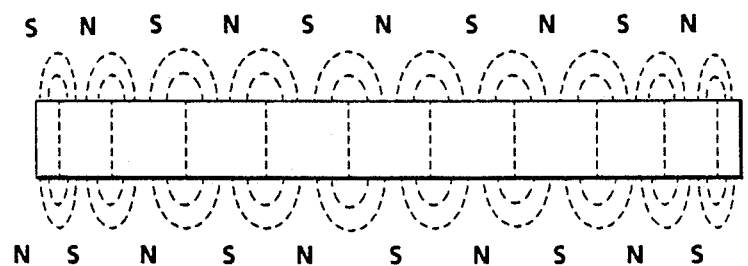
FIGS. 3A and 3B are front and top views, respectively, of a twelve pole pair toroid magnet.
Figure 3B:
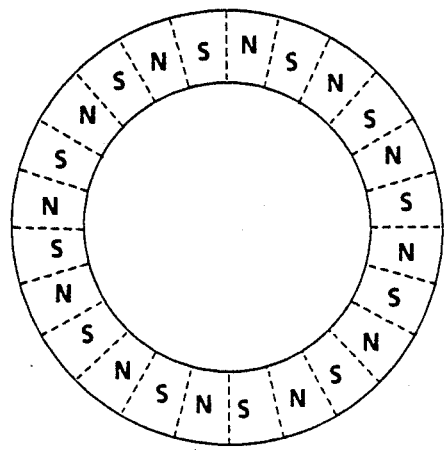

FIG. 2 is a schematic diagram of a twelve "turn" coil that could be utilized in a motor/tachometer. The multi-pole magnet that is intended to be used with this "winding" has twelve pole pairs, as shown in FIGS. 3A and 3B. As the multi-pole magnet rotates with respect to the PCB trace, a potential is generated across each radial segment of the trace, (inner radius to outer radius) each time a pole passes over it.

As the alternate radial elements "see" alternate polarity poles, the potentials that are developed across each radial element are reversed, inner radius relative to the outer radius. Since the radial elements are all connected in series, and since all alternate radial elements have reversed polarities, then the voltage that appears across the open segment will be equal to the sum of all of the radial elements.

Since there are twelve pole pairs in the example shown, the frequency that is generated by this device will be twelve times the rotational speed, i.e., $$F_{Hz} = 12 \times RPS.$$

As the device has only a single phase output, the device cannot sense rotational direction, however, and the output signal will be the same for clockwise and counterclockwise rotation.

The PCB tachometer that is described above and shown in FIGS. 1 to 3 uses a single open loop multi-turn "winding". One can envision two or more such windings that are located on the same center, but of different radii, each encircling the smaller. There would be a requirement that there be an appropriate multi-pole magnet for each "winding", and due to the physical separation of such a configuration, the electrical and magnetic properties would be maintained separately, as separate tachometers. As such, both phase and frequency would be different for each tachometer winding.

Although there may be applications for a multi-frequency tachometer, there is most often the need for a single frequency, but multi-phase device. The multi "winding" configuration could be used for this purpose, but it would not be the most efficient method of implementation in terms of size and weight. Also, it may prove to be difficult to achieve symmetry of signals, as each phase requires a different size "winding" and different size magnet.

Figure 4:
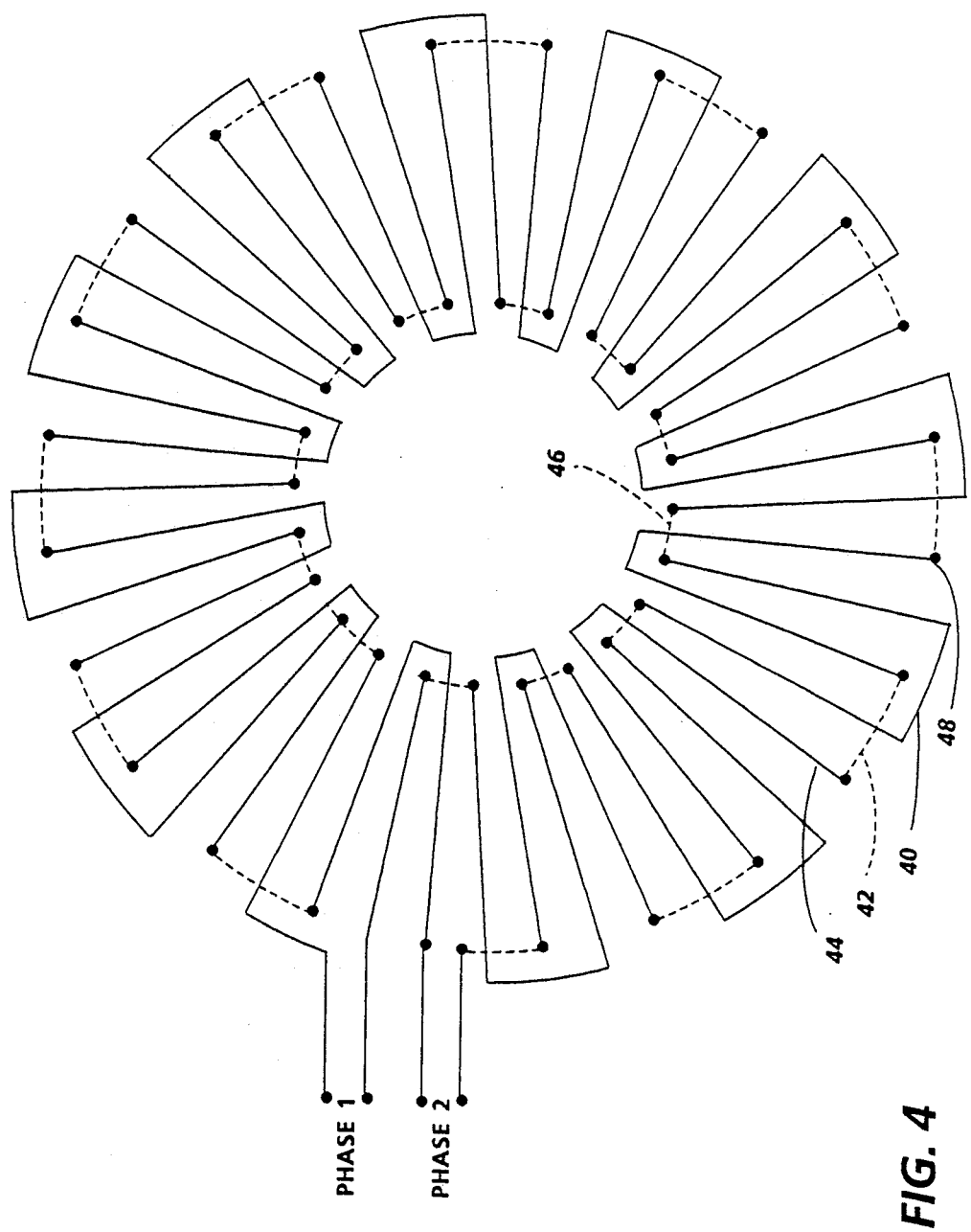
FIG. 4 is a schematic diagram of the top view of a two phase printed circuit board tachometer winding in accordance with one embodiment of the present invention.

A multi "winding", multi-phase PCB tachometer that uses a single multi-pole magnet can be constructed by using double sided boards with plated through holes. See FIG. 4. The radial elements of two or more "windings" can be interlaced with equal spacing, then the ends of the respective elements linked together with PCB trace crossover being accomplished on the back side of the PCB. That is, the radial arms of the traces would all be on one side of the PCB. The outer edges or circumferential elements thereof would be formed as traces on the other side of the board and connected by the many plated through holes 48. The accuracy of the phase relationships is inherent in the accuracy of the PCB and in the use of single multi-pole magnet for both phases. Symmetry in the signals can also be maintained, as the symmetry of "winding" can be implemented as shown in FIG. 4, a two phase version of FIG. 2.

The configurations described in the previous paragraphs use separate open circuit "windings" for each phase. The following paragraphs describe a means to achieve multi-phase operation from a single closed loop "winding" in accordance with further principles of the present invention.

As previously mentioned, as each pole of the multi pole magnet passes over each of the radial traces of the PCB a voltage is induced into that portion of the trace. This voltage is proportional to the field strength and relative velocity of the pole and radial element, and the polarity of the induced voltage is dependent on the pole polarity and direction of the relative motion. As the multi-pole magnet rotates, an a-c voltage is induced into each radial element, with each radial trace developing an a-c voltage with the reversed polarity of its immediate neighbors because of the alternate polarity of the magnetic poles.

In the previously described configuration there was one radial trace for each pole, (twenty four in the example given) and as such, the voltage that is induced into each element is exactly the same phase as all other elements, except for the alternate polarity effect. By connecting all elements in series, in an alternating zigzag pattern, all twenty four of the induced voltages were summed, this sum appearing across the open segment output terminals.

In the new configuration, the number of radial traces and the number of poles are not equal, thus the individual voltages that are generated across each radial segment will not be in phase. If the configuration of poles vs. radial traces is such that for a given voltage and phase that is induced in each radial trace there is a similar voltage of reversed phase that is induced in another radial trace, then the sum of all the induced voltages will be zero. In such a case, where the sum of ALL induced voltages is zero, the output terminals can be connected to each other, as a "short circuit", with no consequence.

In this case, even though there is no voltage generated across the sum of all radial traces, there is still a voltage generated across each radial trace. Also, depending on given configurations, there will still be voltages generated across the sum of certain groups of radial traces, these groups being accessed by locating "taps" on the "winding", as shown in FIG. 5.

Figure 5:
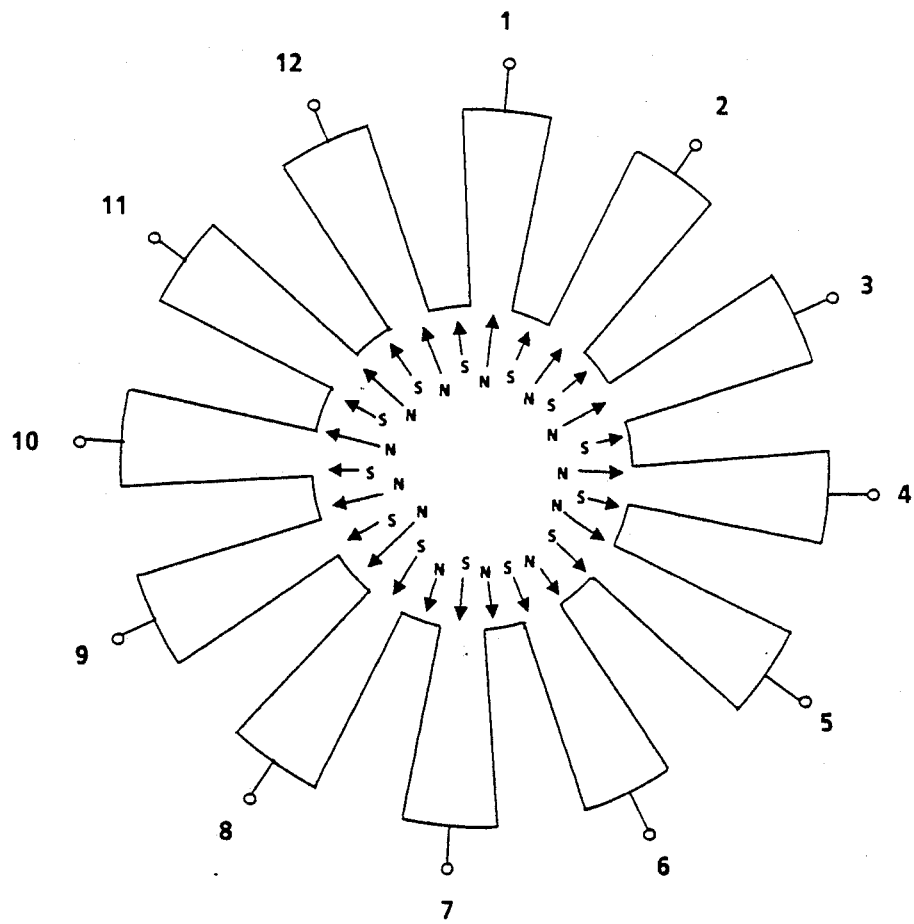
FIG. 5 is a schematic diagram of the top view of a closed loop, multi-phase printed circuit board tachometer winding in accordance with another embodiment of the present invention.

For example, if a "winding" having twenty four traces, such as shown in FIG. 5, is used in conjunction with a twenty six pole magnet, then the sum of the voltages generated in any twelve contiguous radial traces will exactly equal the voltage sum of the remaining twelve traces, but will be 180 degrees out of phase. Thus, a voltage appears across any two opposite "taps", this voltage having a frequency of thirteen cycles per revolution. With twelve taps available, one could use two sets of orthogonal taps for a two phase output, three taps spaced 120 degrees for a three phase output, or even all twelve taps, for a configuration that could be used to provide a six fold increase in the resolution.

For example, for a multi-phase PCB tachometer with twelve tapped turns utilizing a thirteen pole pair magnet, a chart of the various two phase configuration follows:

| Two Phase | | |
|---|---|---|
| Phase 1 (Taps) | | Phase 2 (Taps) |
| 1 & 7 | | 4 & 10 |
| | or | |
| 2 & 8 | | 5 & 11 |
| | or | |
| 3 & 9 | | 6 & 12 |

For three phase operation, the taps to be monitored are:

| Three Phase | | |
|---|---|---|
| Phase 1 (Taps) | Phase 2 (Taps) | Phase (Taps) |
| 1 | 5 | 9 |
| | or | |
| 2 | 6 | 10 |
| | or | |
| 3 | 7 | 11 |
| | or | |
| 4 | 8 | 12 |

Figure 6:
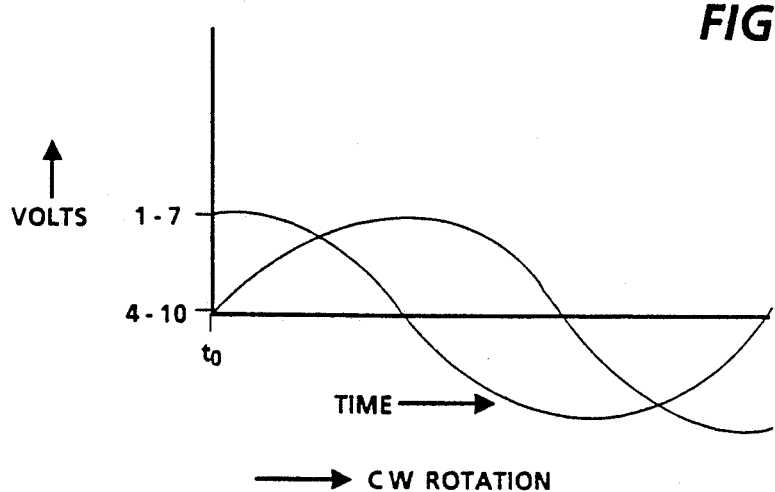
FIG. 6 is a curve of output voltage in relation to time, helpful in understanding the operation of the tachometer described in conjunction with FIG. 5.

FIG. 6 is a family of curves showing the relationships of the various phases and respective taps. The vertical axis is measured in volts, while the horizontal axis is measured in time. With a clockwise rotation, and a two phase operation, as seen above in the first table, the voltage measured or detected at taps 1 and 7 are at a maximum while the voltage at taps 4 and 10 are at a minimum at time $t_o$. However, as the rotating magnetic pole pairs rotate, the voltage on taps 1 and 7 will begin to decrease, while the voltage detected at taps 4 and 10 will increase. The frequency is dependent on the number of tapped turns and the number of pole pair magnets. Thus, the frequencies are the same, but are 90° out of phase with each other. Subsequent electrical circuitry can be then utilized to not only more accurately determine the rotational speed, but also the direction of rotation.

The example given above is only one combination of numbers of poles and radial traces. Many other combinations are possible, each providing some unique property or feature in the nature of number of phases, phase shift, resolution, or a combination of these. Also, the examples given show an equal spacing of radial traces and magnetic poles that are placed concentric to each other. Other effects, such as phase modulation, can be introduced into either the closed loop, or open loop configurations by using unequal spacing of radial traces, magnetic poles, or concentricity. These special cases are all within the scope of this disclosure.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A printed circuit winding pair for use in AC tachometers comprising:

a first winding on a board substrate, said winding having a first terminal and a second terminal, a continuous conductive trace from said first terminal to said second terminal, said trace following a generally serpentine pattern, said pattern being circular in shape, such that said serpentine pattern comprises radial loops extending outwardly from a central point, a second winding on said board substrate, said second winding having a first terminal and a second terminal, a continuous conductive trace from said first terminal to said second terminal, said trace following a generally serpentine pattern, said pattern being circular in shape, such that said serpentine patterns comprises radial loops extending outwardly from a central point, said second winding being rotated slightly from and interwined with said first winding, wherein the outer circular parts of said first winding is formed on the reverse side of said board substrate and connected to the radial traces of said first winding by plated through holes, and wherein the inner circular parts of said secured winding is formed on the reverse side of said board substrate and connected to the radial traces of said second winding by plated through holes, such that said first and second windings are electrically isolated from each other.

* * * * *